(12) United States Patent
Starner

(10) Patent No.: US 8,231,086 B1
(45) Date of Patent: Jul. 31, 2012

(54) LIGHTWEIGHT PORTABLE LAPTOP COMPUTER STAND

(76) Inventor: Alan Lee Starner, Fort Collins, CO (US)

( * ) Notice: Subject to any disclaimer, the term of this patent is extended or adjusted under 35 U.S.C. 154(b) by 31 days.

(21) Appl. No.: 12/584,566

(22) Filed: Sep. 8, 2009

Related U.S. Application Data

(60) Provisional application No. 61/192,478, filed on Sep. 18, 2008.

(51) Int. Cl.
*F16M 11/00* (2006.01)
*F16M 11/32* (2006.01)

(52) U.S. Cl. .................. 248/163.1; 248/188.1; 248/175

(58) Field of Classification Search .................. 248/121, 248/688, 163.1, 170, 917–923, 175, 126, 248/127, 158, 188.1; 361/679.01, 679.08, 361/679.11, 679.02
See application file for complete search history.

(56) References Cited

U.S. PATENT DOCUMENTS

| | | | | |
|---|---|---|---|---|
| 1,197,351 A | * | 9/1916 | Dalglish | 248/464 |
| 4,269,381 A | * | 5/1981 | Harms | 248/465.1 |
| 4,819,266 A | * | 4/1989 | Awakowicz et al. | 379/454 |
| 5,542,314 A | * | 8/1996 | Sullivan et al. | 74/552 |
| 5,695,278 A | * | 12/1997 | Grossman et al. | 362/374 |
| 5,899,421 A | * | 5/1999 | Silverman | 248/175 |
| 6,102,218 A | * | 8/2000 | Alfonso et al. | 211/119 |
| 6,290,411 B1 | * | 9/2001 | Shirai | 400/681 |
| 6,352,233 B1 | | 3/2002 | Barberich | |
| 6,460,221 B1 | * | 10/2002 | Eromaki | 16/286 |
| 6,474,614 B2 | | 11/2002 | MacEachern | |
| D475,057 S | | 5/2003 | Lord | |
| D483,767 S | | 12/2003 | Green et al. | |
| 6,682,040 B1 | | 1/2004 | MacEachern | |
| 6,701,851 B2 | | 3/2004 | Ibrahim | |
| 6,819,548 B2 | | 11/2004 | Hillis et al. | |
| D510,357 S | | 10/2005 | Lye | |
| 7,233,487 B2 | * | 6/2007 | Stinson | 361/679.55 |
| D554,647 S | | 11/2007 | Chan | |
| D557,698 S | | 12/2007 | Lye | |
| D559,850 S | | 1/2008 | Lye | |
| D573,150 S | | 7/2008 | Sween | |
| 7,417,853 B1 | | 8/2008 | Myers et al. | |
| 7,461,957 B2 | * | 12/2008 | Thompson et al. | 362/394 |
| D590,404 S | | 4/2009 | Kim et al. | |
| 7,600,736 B2 | * | 10/2009 | Lee | 248/551 |

OTHER PUBLICATIONS

Keynamics. Laptop Stand. On-line catalog, http://www.keynamics.com, originally downloaded Jun. 23, 2011, 4 total pages.
Amazon.com. Ziotek Pocket Notebook Stand With Bag. On-line catalog, http://www.amazon.com, originally downloaded Jun. 24, 2011, 4 total pages.
Amazon.com. Hercules X-Stand Ergonomic Portable Natural Airflow Cooling Stand for All 12-17" Laptop/Notebook Computers. On-line catalog, http://www.amazon.com, originally downloaded Jun. 24, 2011, 5 total pages.
Amazon.com. Bluelounge Cool Feet—Notebook Stand—Silver. On-line catalog, http://www.amazon.com, originally downloaded Jun. 24, 2011, 5 total pages.
Amazon.com. LapWorks Laptop Legs. On-line catalog, http://www.amazon.com, originally downloaded Jun. 24, 2011, 6 total pages.

* cited by examiner

*Primary Examiner* — Nkeisha Smith
(74) *Attorney, Agent, or Firm* — Craig R. Miles; CR Miles, P.C.

(57) ABSTRACT

A lightweight portable laptop computer stand which lifts the back of the laptop keyboard and the bottom of the display screen for improved ergonomics and increased cooling airflow.

11 Claims, 2 Drawing Sheets

LIGHTWEIGHT PORTABLE LAPTOP COMPUTER STAND

CROSS REFERENCE TO RELATED APPLICATIONS

This application claims the benefit of provisional patent application Ser. No. 61/192,478, filed 2008 Sep. 18 by the present inventor.

BACKGROUND

Laptop computers have become very popular in part due to their easy portability. However the laptop computer creates some ergonomic problems. The screen may be positioned too low for optimal viewing thus creating stress in the shoulders and spine. The keyboard may lie approximately flat, whereas it should be slightly tilted for the optimal wrist position. Additionally, with the bottom of the keyboard against a flat surface such as a table, the ability of the laptop computer to dissipate heat may be reduced, and many laptops overheat.

In order to solve these problems, certain conventional laptop stands elevate the back of the keyboard, thus tilting the keyboard to improve the wrist position, and simultaneously lifting the screen to improve the viewing angle. Some of these stands also incorporate cooling fans to assist heat dissipation. However, a substantial problem with the conventional laptop stands can be a lack of portability. This lack of portability requires that a laptop stand be purchased for each location in which the laptop computer will be used in order to maintain the ergonomic and heat dissipation qualities; generally this is a work space or office location, and at home. However many users have a variety of locations in which they want to use a laptop computer, such as in coffee shops, while traveling, or the like.

Therefore there remains a need for an easily portable laptop stand that provides lift for the back of the keyboard and screen, and provides improved airflow to the underside of the laptop computer. The instant inventive lightweight portable laptop computer stand addresses these concerns.

SUMMARY OF THE INVENTION

Accordingly, a broad object of the invention can be to provide a portable laptop stand which lifts or elevates the back of the keyboard of a laptop computer. This provides the two ergonomic benefits to the user including tilting the keyboard to benefit the wrists, and lifting the display screen to correspondingly benefit the shoulders and spine.

A second broad object of the invention is to provide a portable laptop stand compatible with a wide range of laptop computer models which will vary in width and keyboard thickness.

A third broad object of the invention is to provide a portable laptop stand which allows for the free flow of air underneath the laptop computer to allow for better laptop cooling.

A fourth broad objective of the invention is to provide a portable laptop stand which allows for the degree of tilt of the keyboard to be adjusted within a range to better suit the user's preference.

A fifth broad objective of the invention is to provide a laptop stand which is small and lightweight so that it is easily portable.

A BRIEF DESCRIPTION OF THE DRAWINGS

DETAILED DESCRIPTION OF THE PREFERRED EMBODIMENTS

Figure 1:
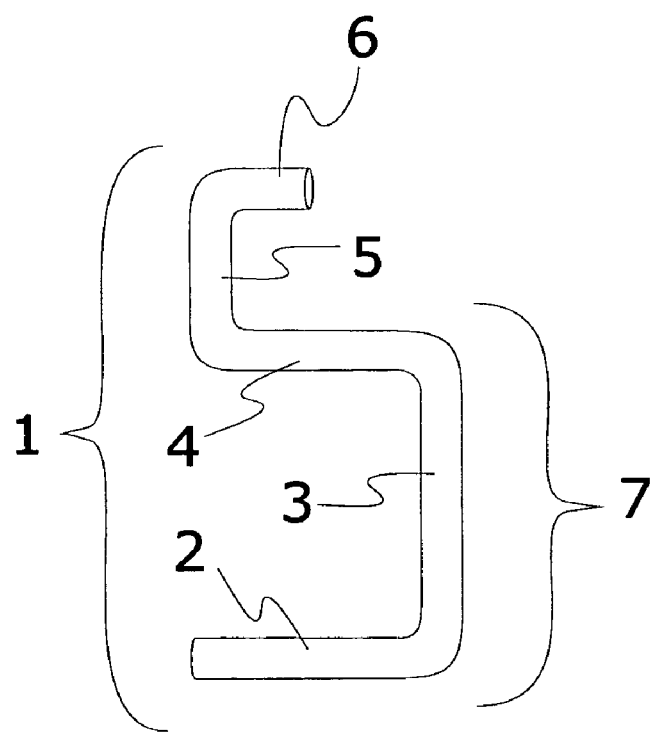
FIG. 1 is a top view of a particular embodiment of a laptop stand.

A laptop stand (1) which couples to a laptop computer (9) for improving the positioning of the laptop computer (9) while on a table, desk or other support surface (11). One laptop stand (1) is placed on the right side of the laptop computer (9), and one laptop stand (1) is placed on the left side of the laptop computer (9). Two laptop stands (1) are used to support the laptop computer (9), one on the left side and one on the right side. These laptop stands (1) can be identical and interchangeable.

For the purposes of the present invention, the term "a" or "an" entity refers to one or more of that entity; for example, "a laptop stand" refers to one or more laptop stand(s) or at least one laptop stand. As such, the terms "a" or "an", "one or more" and "at least one" can be used interchangeably herein. Furthermore, the term "selected from the group consisting of" refers to one or more of the related elements in the list that follows, including combinations of two or more of the listed elements.

Ranges may be expressed herein as from "about" one particular value to "about" another particular value. When such a range is expressed, one embodiment of the invention includes from approximately the one particular value to approximately the other particular value and another embodiment includes from the one particular value to the other particular value. It will be further understood that the endpoints of each of the ranges are significant both in relation to the other endpoint, and independent of the other endpoint. Similarly, when a value is expressed as an approximation by use of the antecedent "about," it will be understood that an embodiment of the invention includes approximately the particular value while the particular value forms another embodiment of the invention.

The term "a person" for the purposes of this invention broadly encompasses any individual regardless of age or sex which can use the inventive laptop stand (1) or the method of laptop computer position enhancement described herein.

The term "laptop computer (9)" for the purposes of this invention means a portable computer with a keyboard section and a display section that fold together while not in use for easy portability. This would include laptop, notebook and netbook computers or the like.

The term "laptop stand (1)" for the purpose of this invention, means the inventive portable laptop computer stand which is the main subject of this disclosure.

Figure 2:
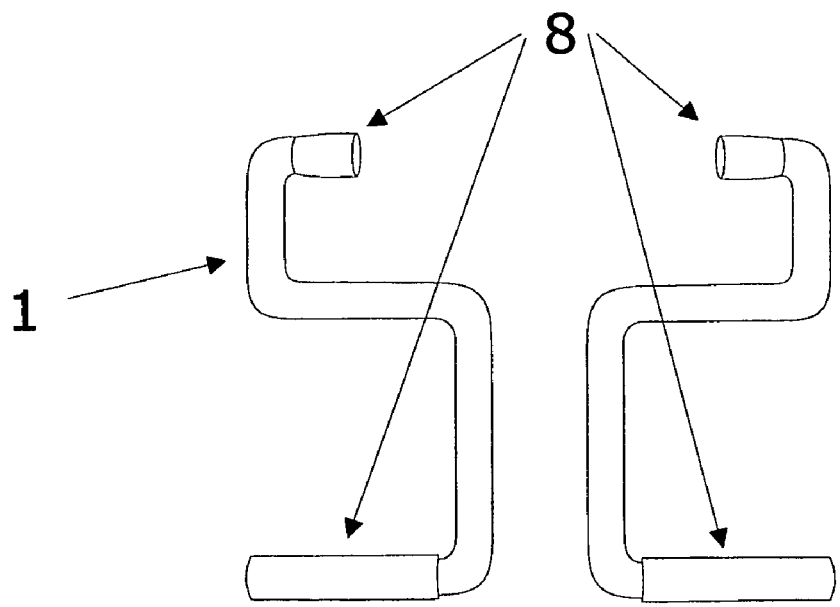
FIG. 2 is a top view of a particular embodiment of a laptop stand shown with optional end covers.
Figure 3:
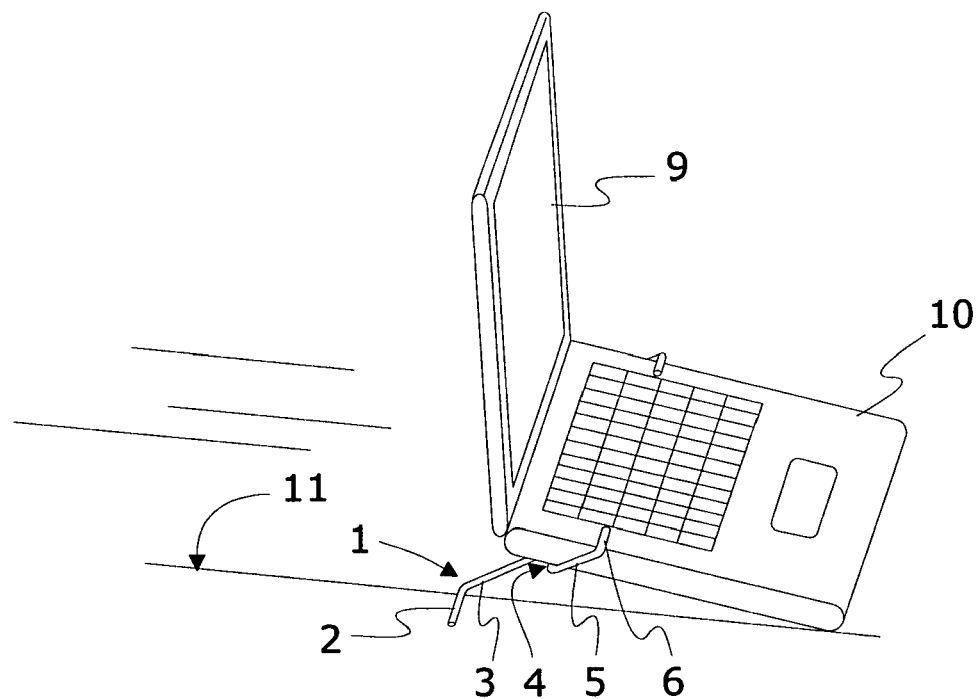
FIG. 3 is a perspective view of a particular embodiment of a laptop stand showing a method of use on a laptop computer.

Now referring primarily to FIGS. 1, 2 and 3, which shows a non-limiting embodiment of a laptop stand (1). Two laptop stands (1) will be used to support the laptop computer (9), one for each side of the laptop computer (9). The laptop stands (1) may be fabricated out of a variety of materials, including as a non-limiting example plastic via plastic injection molding. Certain embodiments of the laptop stand (1) can be formed of metal such as stainless steel or aluminum, and formed via standard industrial techniques such as wire bending; if so created, end covers (8) may be further engaged with the ends of the laptop stand (1). The end covers (8) may for example take the form of vinyl or plastic caps placed over the ends of the laptop stand (1) to protect the laptop computer (9) and support surface (11) from scratches and to provide a degree of friction sufficient to avoid slippage. The end covers (8) are depicted in FIG. 2.

Each laptop stand (1) consists of five sections as noted in FIGS. 1 and 3. When in position on the laptop computer (9) as shown in FIG. 3, the following describes each of the five sections:

a) A support foot (2) can be in contact with the support surface (11).
b) A support leg (3) extends upward toward the back of the laptop keyboard (10).
c) A support top (4) rests against the back of the laptop keyboard (10).
d) A structure arm (5) can be positioned proximate to the side of the laptop keyboard (10).
e) A structure hand (6) can be positioned over the top edge of the laptop keyboard (10).
f) A support body (7) is composed of the support foot (2), support leg (3) and support top (4), and in some embodiments may be combined into a single entity.

With the two laptop stands (1) in place on the laptop computer (9), the weight of the back of the laptop computer (9) is against the support top (4). The structure hand (6) of the laptop stand (1) will rest on the top surface of the laptop keyboard (10), and limit the degree of tilt of the laptop stand (1) with the support foot (2) being distal to the front of the laptop keyboard (10).

By using the rigid structure of the laptop keyboard (10) itself, the size of the laptop stand (1) is minimized, and this allows for light-weight and easy portability of the laptop stand (1). Additionally, with the back of the laptop keyboard (10) elevated, air is free to flow underneath the laptop keyboard (10) to allow for greater heat dissipation of the laptop computer (9).

Figure 4:
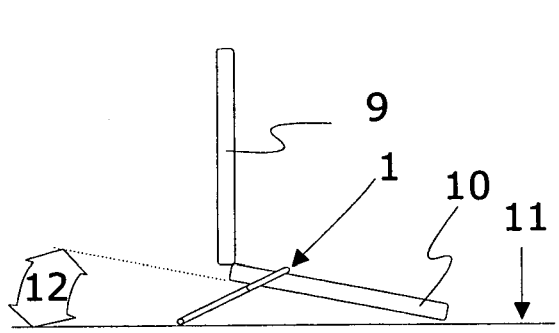
FIG. 4 is a side view of a particular embodiment of a laptop stand showing a method of use which locates the laptop stand at a rearward location which lessens the tilt of the laptop keyboard.
Figure 5:
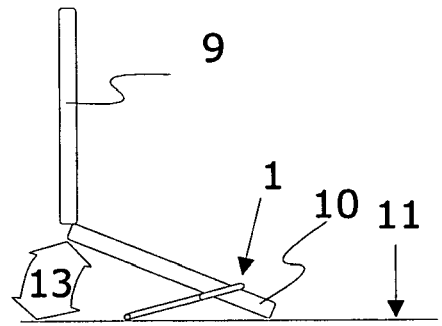
FIG. 5 is a side view of a particular embodiment of a portable laptop stand showing a method of use which locates the laptop stand at a forward location which increases the tilt of the laptop keyboard.

In order to adjust the tilt of the laptop keyboard (10), the laptop stands (1) can be positioned forward or backward along the side of the laptop keyboard (10). FIG. 4 shows the laptop stands (1) positioned closer to the rear of the laptop keyboard (10) for a lesser degree of tilt (12), as well as a lower screen position. FIG. 5 shows the laptop stands (1) positioned closer to the front of the laptop keyboard (10) for a greater degree of tilt (13), as well as a higher screen position. In this way the user may provide the optimum combination of keyboard tilt and screen height for their needs.

By providing an appropriate length of the structure arm (5), laptop keyboards (10) of varying thickness may be accommodated. When the laptop keyboard (10) is thinner than average, the tilt provided will be less than for a thicker laptop keyboard (10), and when the laptop keyboard (10) is thicker, the tilt will be greater. By adjusting the tilt as mentioned above, the thickness of the laptop keyboard (10) and it's affect on the tilt may be compensated for.

Since the laptop stands (1) used on each side of the laptop keyboard (10) are not attached to each other, laptop keyboards (10) of any width may be accommodated.

In an alternative embodiment, the support foot (2), support leg (3) and support top (4) may be combined into a support body (7), a single piece with a substantially trapezoidal shape with the top and bottom surfaces parallel to each other.

End covers (8) may be placed over the ends of the laptop stand (1). Made of vinyl, rubber, or similar material, these end covers (8) can reduce scratching of the laptop computer (9), as well as any support surface (11) on which the laptop stand (1) is used. Additionally, these end covers (8) can function to increase the coefficient of friction of the laptop stand (1) where it interfaces with the top of the laptop keyboard (10), and the support surface (11). The structure arm (5), support top (4) and support leg (3) can also be covered or coated.

As can be easily understood from the foregoing, the basic concepts of the present invention may be embodied in a variety of ways. The invention involves numerous and varied embodiments of a portable laptop computer stand and methods of using the stands.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "support" should be understood to encompass disclosure of the act of "supporting"—whether explicitly discussed or not—and, conversely, were there effectively disclosure of the act of "supporting", such a disclosure should be understood to encompass disclosure of a "support" and even a "means for supporting." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the portable laptop computer stands herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of supporting a laptop computer comprising:
   a) engaging a first support body to an underside of a laptop keyboard, said support body having the form of a first elongate segment and a second elongate segment disposed generally in planar parallel spaced apart relation, each said segment having a length disposed between a first end and a second end, one of said first ends correspondingly connected proximate an opposed end of a support leg maintaining said spaced apart relation, said second elongate segment adapted to engage said underside of a laptop keyboard;
   b) locating a structure arm which extends from said first support body proximate a first side of said laptop keyboard;
   c) engaging a structure hand which extends from said structure arm at a location on a topside of said laptop keyboard, said structure hand in the form of a third elongate segment disposed in generally planar parallel spaced space relation to said first and second elongate segments, said second end of said second elongate member and a second end of said third elongate member coupled proximate opposed ends of said structure arm maintaining said spaced apart relation, said spaced apart relation of said second elongate segment and said first elongate segment sufficient to elevate said laptop keyboard in angled relation to a support surface.

2. The method of supporting a laptop computer as described in claim 1, further comprising covering at least in part said first elongate segment and said third elongate segment with end covers.

3. The method of supporting a laptop computer of claim 1, further comprising:
   a) engaging a second support body to the underside of a laptop keyboard;
   b) locating a structure arm which extends from said second support body proximate a second side of said laptop keyboard;
   c) engaging a structure hand which extends from said structure arm at a second location on said topside of said laptop keyboard.

4. A method of producing a laptop computer support, comprising:
   a) providing a first support body engaging an underside of a laptop keyboard, said support body having the form of a first elongate segment and a second elongate segment disposed generally in planar parallel spaced apart relation, each said segment having a length disposed between a first end and a second end, one of said first ends correspondingly connected proximate an opposed end of a support leg maintaining said spaced apart relation, said second elongate segment engaging said underside of a laptop keyboard;
   b) coupling a structure arm to said support body, said structure arm extending from said support body proximate a side of said laptop keyboard; and
   c) coupling a structure hand to said structure arm, said structure hand engaging a topside of said laptop keyboard, said structure hand in the form of a third elongate segment disposed in generally planar parallel spaced space relation to said second elongate segment, said second end of said second elongate member and a second end of said third elongate member coupled proximate opposed ends of said structure arm maintaining said spaced apart relation, said spaced apart relation of said second elongate segment and said first elongate segment elevating said laptop keyboard in angled relation to a support surface.

5. The method of producing a laptop computer support as described in claim 4, further comprising covering at least in part said first elongate segment and said third elongate segment with end covers.

6. The method of producing a laptop computer support as described in claim 4, further comprising providing a pair of laptop computer supports discrete from one another, each of said pair including elements a) through c).

7. A laptop computer support, comprising:
   a) a first elongate segment and a second elongate segment disposed generally in planar parallel spaced apart relation, each said segment having a length disposed between a first end and a second end, one of said first ends correspondingly connected proximate an opposed end of a support leg maintaining said spaced apart relation, said second elongate segment engaging said underside of said laptop keyboard;
   b) a structure arm which extends from said support body engaging a first side of a laptop keyboard; and
   c) a structure hand in the form of a third elongate segment disposed in generally planar parallel spaced space relation to said first and second elongate segments to provide a generally flat support body, said second end of said second elongate member and a second end of said third elongate member coupled proximate opposed ends of said structure arm maintaining said spaced apart relation, said structure hand engaging a topside of said laptop keyboard upon location of said laptop keyboard proximate said support arm, said spaced apart relation of said second elongate segment and said third elongate segment engaged to a thickness of said laptop keyboard, and wherein said spaced apart relation of said second elongate segment and said first elongate segment elevating said laptop keyboard in angled relation to a support surface.

8. The laptop computer support as described in claim 7, further comprising end covers coupled to at least part of said first elongate segment and said third elongate segment with end covers.

9. The laptop computer support of claim 7, wherein said laptop computer support comprises a pair of laptop computer supports discrete from one another, each of said pair including elements a) through c).

10. A laptop computer support, comprising:
   a) a first elongate segment, a second elongate segment, and a third elongate segment generally disposed in planar parallel spaced apart relation, each said elongate segment having a length disposed between a first end and a second end;
   b) a first crosspiece coupled between said first ends of said first elongate segment and said second elongate segment maintaining said spaced apart relation;
   c) a second crosspiece coupled between said second ends of said second elongate segment and said third elongate segment maintaining said spaced apart relation to provide a generally flat support body, said spaced apart relation of said first elongate segment to said second elongate segment engaged to a thickness of a laptop keyboard of a laptop computer, and wherein said spaced apart relation of said second elongate segment and said third elongate segment elevating said laptop keyboard in angled relation to a support surface.

11. The laptop computer support of claim 10, wherein said laptop computer support comprises a pair of laptop computer supports discrete from one another, each of said pair including elements a) through c).

\* \* \* \* \*